United States Patent [19]

Dietrich

[11] 4,137,636
[45] Feb. 6, 1979

[54] PROFILE SYSTEM FOR WALLS AND BRACKET THEREFOR

[75] Inventor: Johann Dietrich, Northam, Australia

[73] Assignee: Universal Bricklaying Systems Pty. Ltd., Northam, Australia

[21] Appl. No.: 762,955

[22] Filed: Jan. 26, 1977

[30] Foreign Application Priority Data

Oct. 2, 1975 [AU] Australia .............................. PC3438
May 21, 1976 [AU] Australia .............................. PC6006

[51] Int. Cl.² ............................................. G01C 15/10
[52] U.S. Cl. ..................................................... 33/85
[58] Field of Search ............... 33/85, 86, 339; 269/19, 269/166, 321 S

[56] References Cited

U.S. PATENT DOCUMENTS

| 987,424 | 3/1911 | Bethel | 33/85 |
|---|---|---|---|
| 1,004,194 | 9/1911 | Platt | 33/85 |
| 2,491,638 | 12/1949 | Ayers | 269/321 S |
| 2,788,579 | 4/1957 | Mills | 33/85 |
| 2,883,677 | 4/1959 | Geen | 269/166 X |
| 2,893,125 | 7/1959 | Kampel | 33/85 |
| 3,205,582 | 9/1965 | Andrews | 33/85 |
| 3,349,494 | 10/1967 | Blake | 33/85 |
| 3,626,434 | 12/1971 | Miller | 33/86 |

Primary Examiner—Charles E. Phillips
Attorney, Agent, or Firm—Haseltine, Lake & Waters

[57] ABSTRACT

A bracket for a profile apparatus for block walls having a body, two spaced arms extending normally to the body, one of the arms having an adjustable screw. Apparatus for establishing a vertical in a block wall incorporates the bracket together with a tube to be set vertical and held against the wall by the bracket.

10 Claims, 11 Drawing Figures

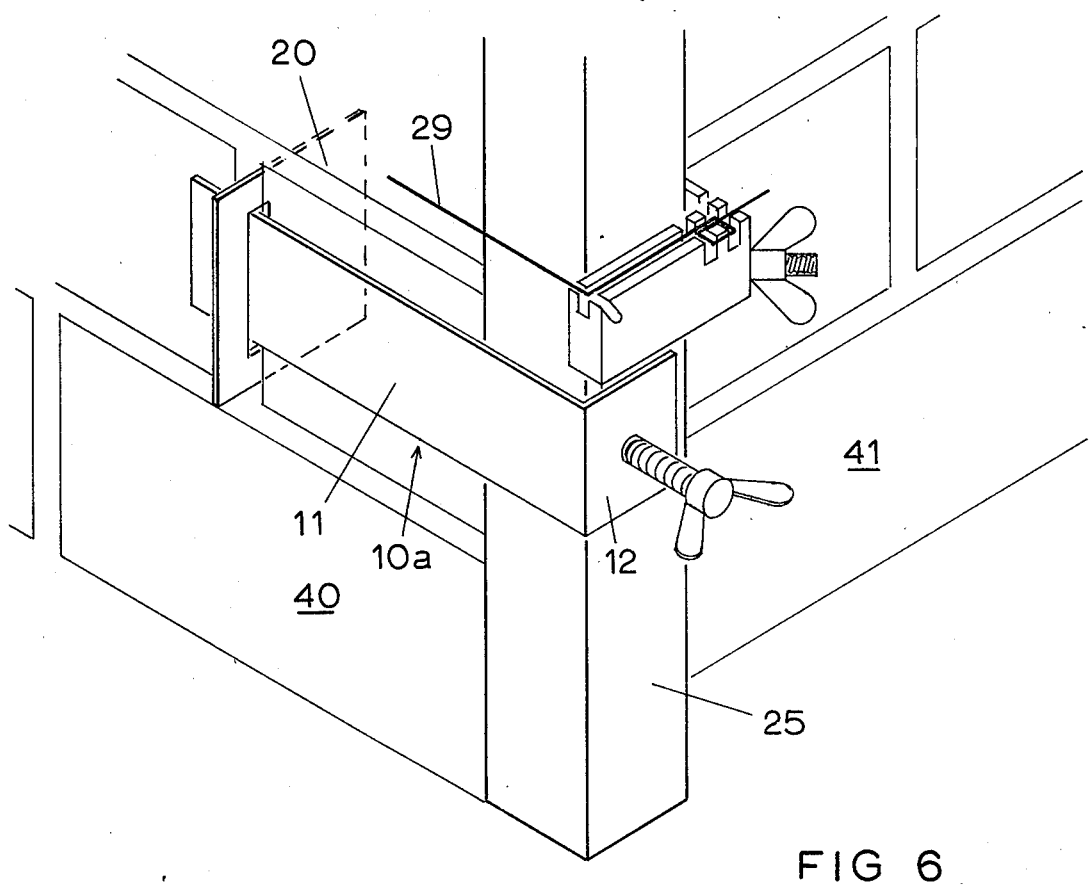
FIG 6
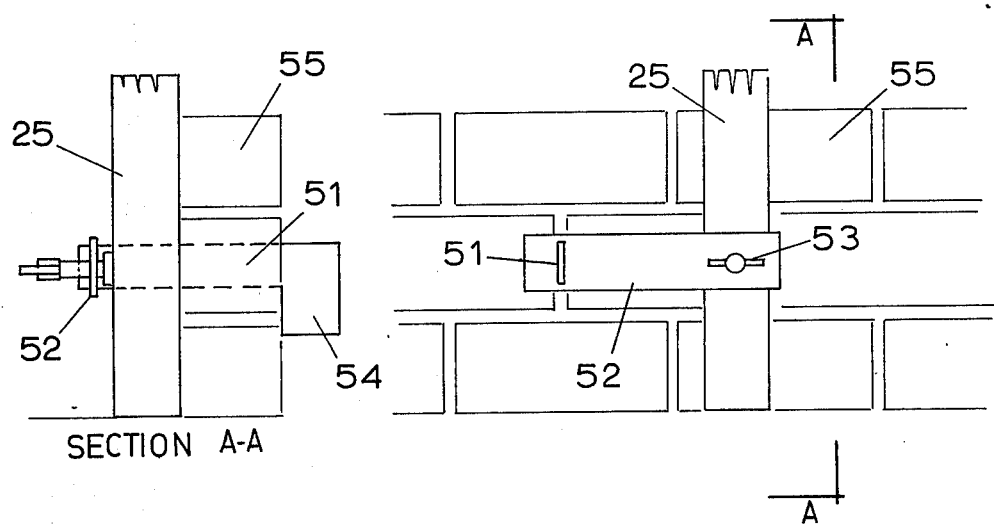
SECTION A-A
FIG 11
FIG 10

PROFILE SYSTEM FOR WALLS AND BRACKET THEREFOR

BACKGROUND OF THE INVENTION

The invention relates to apparatus used in building walls of brick or blocks (for convenience termed "blocks") to establish true verticals on the wall or at corners between walls. The apparatus may also provide true horizontals by a string-line.

In existing arrangements, considerable skill and time is necessary to set up the profile before blocklaying can commence.

SUMMARY OF THE INVENTION

An object of this invention is to provide simple apparatus which can be quickly set up by less skilled workmen. Accordingly, the invention in one aspect comprises a bracket for a profile apparatus for block walls; said bracket including an elongated flat body; a first flat arm extending normal to the longitudinal axis of said body; a second flat arm on said body with its plane normal to the plane of said body and spaced from said first arm; and an adjustable screw on said second arm.

The spacing between the arms may be adjustable and the first arm may be either co-planar with or normal to the plane of the body.

In another aspect, the invention comprises apparatus for establishing a vertical in block wall construction, said apparatus including a rectangular-section tube to be set vertical; a bracket as above defined, said first arm being inserted between adjacent blocks of said wall; and said screw bearing against said tube to hold it vertical against said wall surface.

BRIEF DESCRIPTION OF THE DRAWINGS

In order that the invention may be better understood various embodiments will be described with reference to the accompanying drawings, in which:

FIG. 6 shows apparatus at an outside corner of a wall;

FIG. 10 shows a face view of the bracket of FIG. 9 in use; and

FIG. 11 is a section taken on line 11—11 of FIG. 10.

DETAILED DESCRIPTION OF THE PREFERRED EMBODIMENT OF THE INVENTION

Figure 1:
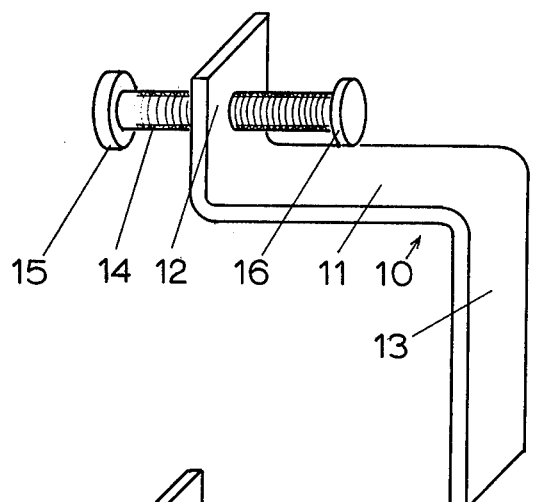
FIG. 1 shows a view of a bracket for use with the invention.

The bracket 10 of FIG. 1 is a flat metal strip bent to form an elongated body 11 with oppositely-extending arms 12, 13 at either end.

Arm 12 has a screw 14 threaded through it with a widened head 15 on that end remote from body 11, and means 16 for turning the screw on the other end. The head 15 may be fitted as a swivel head on screw 14.

Figure 2:
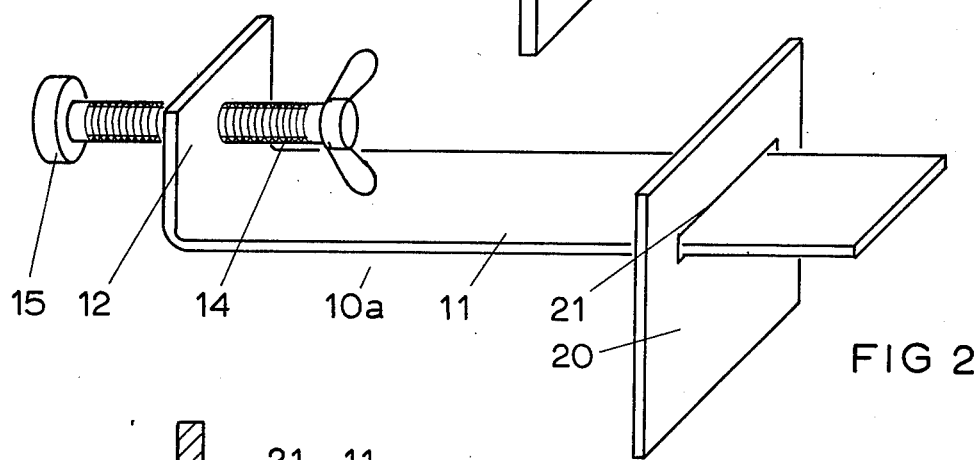
FIG. 2 shows a modified bracket.

The bracket 10A of FIG. 2 is similar to that of FIG. 1 having body 11, arm 12, screw 14, and head 15, but fixed arm 13 of FIG. 1 is replaced by an arm 20 movable along body 11.

Arm 20 has a slot 21 therein through which body 11 passes. As shown in section in FIG. 3, slot 21 is angled so that edges 22 of the slot 21 bite into and bind on body 11 when arm 20 is approximately at right angles to body 11 alternatively, as shown in FIG. 4 slot 21 may be at right angles to arm 20 but arm 20 may be slightly bent, giving the same effect. In a further alternative form (not shown), arm 20 is slightly bent at slot 21 so that slot 21 is radially convergent.

The three alternative arrangements enable adjustment of arm 20 along body 11 but as soon as a twisting force is exerted on arm 20 it binds on arm 11. Furthermore, arm 20 may be slipped off body 11 and reversed to lie on the same side of body 11 as arm 12.

Figure 5:
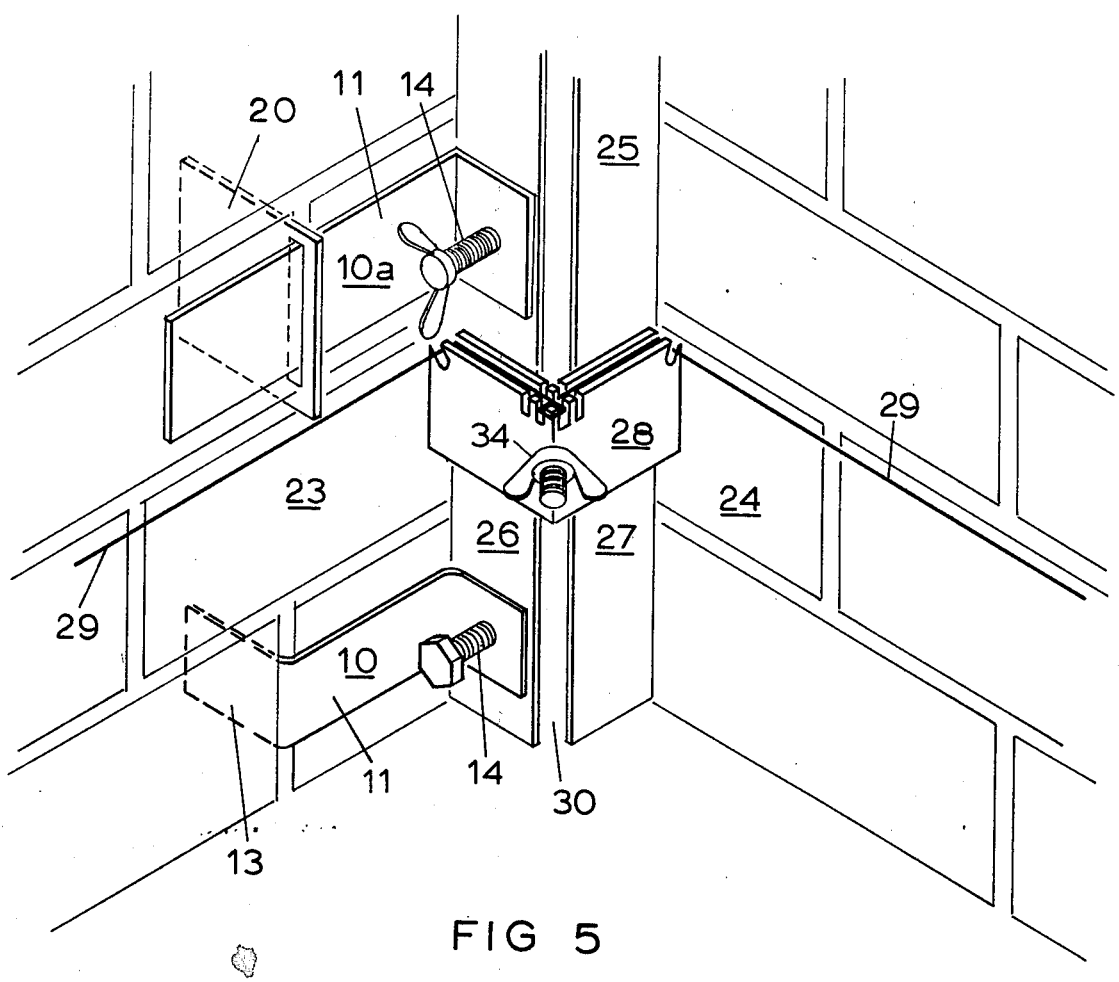
FIG. 5 shows the apparatus using brackets of FIGS. 1 and 2 at an inside corner of a wall.

FIG. 5 shows an internal corner between walls 23 and 24 with apparatus including brackets 10 and 10A in operative position.

A square-section steel tube 25 is placed in the corner and retained in position by one or more brackets 10 or 10A.

Arm 13 of bracket 10 (or arm 20 of bracket 10A) is inserted between blocks in a course, with body 11 extending towards tube 25 and the head 15 of screw 14 bearing against the tube face 26 to hold it firmly in place. Tube 25 is made truly vertical by use of a plumb-line or similar means, and acts thereafter as a profile standard for the walls.

For clarity, brackets 10, 10A are shown bearing only against face 26, but it is to be understood that brackets may also be used on wall 24 bearing against face 27 of tube 25.

In either bracket, screw 14 enables some adjustment, but in bracket 10A greater adjustment is possible by sliding of arm 20 along body 11, so that bracket 10A is suited to a wider range of block sizes.

Figure 7:
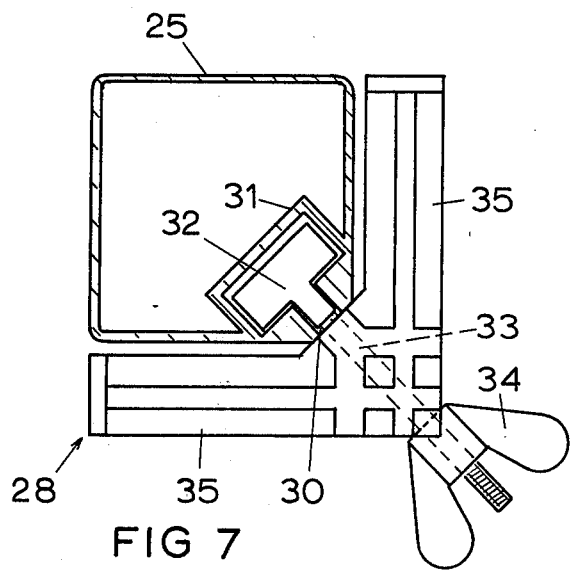
FIG. 7 shows a plan view of a string-line carrier on a tube.
Figure 8:
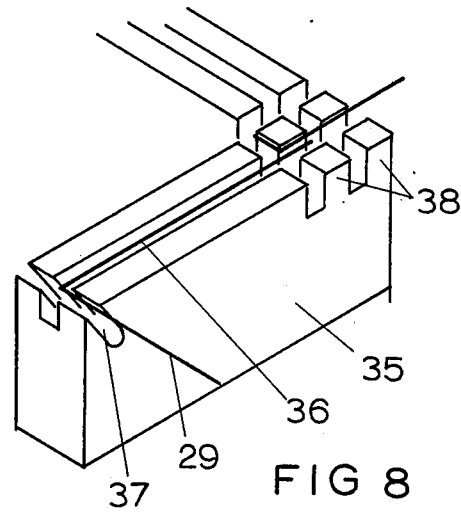
FIG. 8 shows a detail of part of the carrier of FIG. 7.

A carrier 28 for a string-line 29 is slidably mounted on tube 25, details of carrier 28 and its relation to tube 25 being shown in FIGS. 7 and 8.

Tube 25 has a longitudinal slot 30 in its edge, leading to an internal rectangular-section longitudinal member 31, within which a plug 32 is slidably mounted. A bolt 33 passes through a corner hole in carrier 28, through slot 30 and is fixed at its inner end to plug 32. A nut 34 engages the other end of bolt 33. Alternatively, plug 32 may be fitted as a swivel head on bolt 33.

Carrier 28 may thus slide to any position along tube 25 and be secured by nut 34.

Each arm 35 of carrier 28 is made to extend very close to walls 23, 24 when secured. The upper face of each arm (as shown in FIG. 8) has a longitudinal groove 36 and a transverse groove 37 at its end.

At the junction of arms 35 the upper face is formed into a series of spaced pegs 38. A string-line 29 (FIGS. 5 & 8) may be tightened and pass via grooves 37 and 36 to pegs 38, round which it is wound to retain it in stretched condition.

The internal member 31 within tube 25, as well as acting as a guide for carrier 28, greatly strengthens tube 25 and prevents distortion under stress.

FIG. 6 shows a similar assembly to that of FIG. 5 except that tube 25 is mounted externally on a corner between walls 40, 41.

Figure 3:
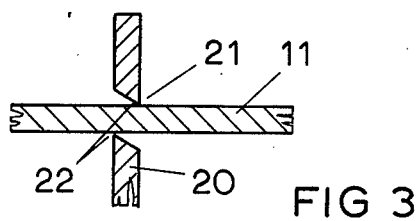
FIG. 3 shows in section part of the bracket of FIG. 2.
Figure 4:
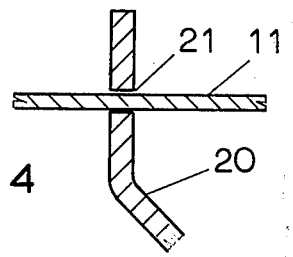
FIG. 4 shows also in section a minor modification of the bracket of FIG. 2.

Bracket 10A is similar to that shown in FIG. 3 but with arm 20 reversed to lie on the same side of body 11 as arm 12. Tube 25 is as shown in FIG. 7 and has a slidably mounted carrier 28 with string-line 29 as before. It is believed that the operation of the FIG. 6 assembly will be clear without further description.

Figure 9:
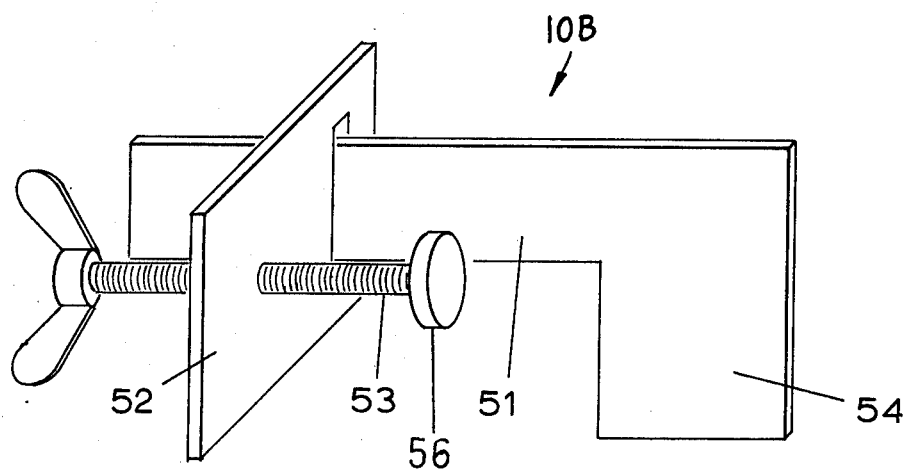
FIG. 9 shows an embodiment of a bracket in use along a straight wall.

FIGS. 9, 10 and 11 illustrate the use of a modified bracket 10B (shown in FIG. 9) for attaching a square tube 25 to the face of a wall rather than in a corner.

The bracket 10B has a body 51 and a slotted arm 52 similar to arm 20 of FIG. 2.

In this case, however, arm 52 carries a screw 53 corresponding to screw 14 of FIG. 2. The head, 56, of screw 53 may be fitted as a swivel head on the screw.

At the right-hand of body 51, and arm 54 extends out from the body 51 being coplanar with it, so that body 51 and arm 54 form a flat L-shaped sheet.

In use, body 51 and arm 54 are passed through the wall 55 via a vertical space between blocks, so that arm 54 lies behind a block in the next course and resists retractive force on the bracket. Screw 53 (as before) bears on tube 25, in this case on its outer face, and holds it tight against wall 55 as shown in FIGS. 10 and 11.

A string-line carrier may be used, being either of the form of FIG. 7 or of rectangular U-shape, its side arms being adjacent the sides of tube 25 and its other arm running across the outer face of the tube.

If desired, the arm 52 can be provided with an offset bend about the slot in the same manner as that described for the third alternative form of arm 20.

I claim:

1. Apparatus for establishing verticality in block wall construction, said apparatus comprising a rectangular-section tube to be set vertically and a bracket, said bracket including:
   an elongated flat body having a longitudinal axis;
   a first flat arm extending normal to the longitudinal axis of said body;
   a second flat arm on said body extending in a plane normal to the plane of said flat body and spaced from said first arm;
   an adjustable screw mounted on said second arm;
   said first arm being inserted between adjacent blocks of said wall;
   and said screw bearing against said tube to hold the tube vertically against said wall, a string-line carrier slidably mounted on said tube, and means for securing said carrier at any selected position along said tube, said carrier including two arms arranged in L-shape and having a longitudinal slot in the upper surface of each arm joining a transverse slot in the extremity of that arm.

2. Apparatus as claimed in claim 1 in which one arm of said bracket is adjustable along said body to vary the arm spacing.

3. Apparatus as claimed in claim 1 in which said arms of said bracket extend in opposite directions from said body in planes normal to the plane of said body.

4. Apparatus as claimed in claim 3 in which said tube is held against the inside of a corner of a wall.

5. Apparatus as claimed in claim 1 in which said arms of said bracket extend in planes normal to the plane of said body and on the same side thereof.

6. Apparatus as claimed in claim 5 in which said tube is held against the outside of a corner of said wall.

7. Apparatus as claimed in claim 1 in which said first arm of the bracket is coplanar with said body, and the plane of said second arm is normal to the plane of said body.

8. Apparatus as claimed in claim 7 in which said tube is held against the surface of a straight portion of said wall.

9. Apparatus as claimed in claim 1, in which said tube is longitudinally slotted at one corner and has an internal member across said corner, and said securing means includes a bolt passing through said carrier and said slot and a plug slidable on said internal member and attached to said bolt.

10. Apparatus as claimed in claim 1, in which said carrier includes a series of pegs in its upper surface at the junction of said arms.

* * * * *